No. 716,887. Patented Dec. 30, 1902.
F. W. GUNN.
SAP BUCKET COVER.
(Application filed June 10, 1902.)
(No Model.)
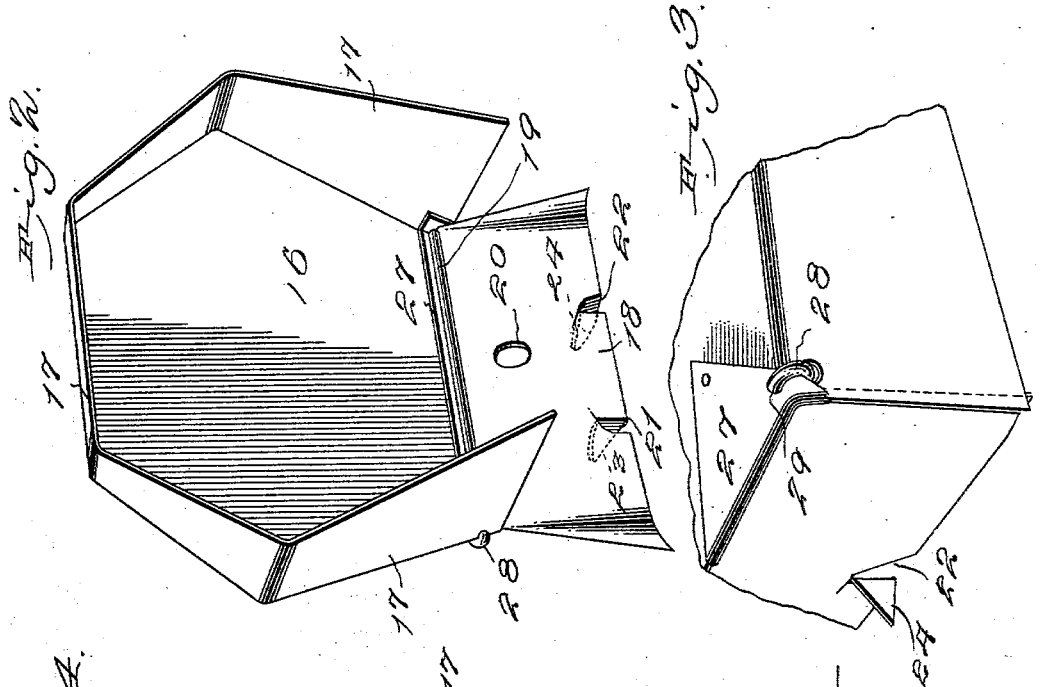
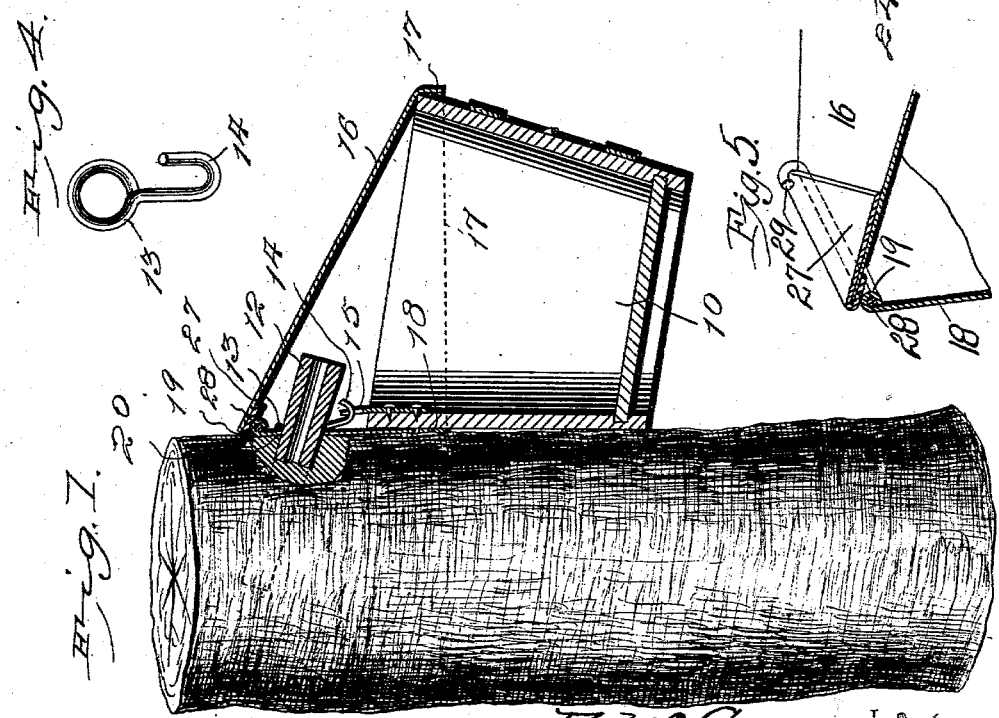
Witnesses
E. J. Stewart
C. N. Woodward
F. W. Gunn Inventor
by C. A. Snow & Co
Attorneys

UNITED STATES PATENT OFFICE.

FRED W. GUNN, OF KEENE, NEW HAMPSHIRE.

SAP-BUCKET COVER.

SPECIFICATION forming part of Letters Patent No. 716,887, dated December 30, 1902.

Application filed June 10, 1902. Serial No. 111,046. (No model.)

*To all whom it may concern:*

Be it known that I, FRED WILLIS GUNN, a citizen of the United States, residing at Keene, in the county of Cheshire and State of New Hampshire, have invented a new and useful Sap-Bucket Cover, of which the following is a specification.

The invention relates to covers or shields for protecting the contents of sap-buckets while applied to the trees and excluding therefrom dirt, leaves, rain, snow, and other foreign matter; and the object of the invention is to provide a simple, inexpensive, and efficient device adapted to remain attached to the tree during the sap-running season in position to cover the bucket and capable of movement to permit the application and removal of the bucket.

Further objects and advantages of this invention will appear it the following description, and the novel features thereof will be particularly pointed out in the appended claims, it being understood that changes in the form, proportion, and the minor details of construction may be resorted to without departing from the spirit or sacrificing any of the advantages of this invention.

In the drawings, Figure 1 is a sectional view of the cover or shield applied|in the operative position to a tree and having a sap-bucket, also shown in section, associated therewith. Fig. 2 is a detail view in perspective of the cover. Fig. 3 is a similar view of a portion of the cover to show the construction of the hinge. Fig. 4 is a detail view of the bucket-supporting hook. Fig. 5 is a detail sectional view of the hinge-joint between the members of the cover.

Similar reference characters indicate corresponding parts in all the figures of the drawings.

The cover or shield embodying the invention is shown in Fig. 1 of the drawings applied to a sap-bucket 10 of the ordinary construction, which is suspended from a tree by means of a hook 14, having an eye 13 engaged with a sap-spout 12, applied in the ordinary way to the tree and preferably tapered in diameter toward its inner end, whereby the enlarged projecting end prevents the accidental displacement of the hook. The bucket is provided with the usual eye 15 for engaging the hook.

The cover or shield consists of a plate 16, hinged to a supporting-wing 18, which is rolled at its upper edge to form a sheath 19, through which projects a pin 28, which also terminally engages openings in flanges 17, which depend from the side and front edges of the plate 16. A reinforcing-strip 27 is also preferably secured to the cover-plate 16 near its rear edge and is folded around said rear edge to lie in contact with the outer and inner surfaces of the plate, and the hinge-pin or pintle extends through the extremities of said reinforcing-strip, as well as through the flanges 17, to increase the durability of the device. The side edges of the supporting-wing are extended forward or outward, as shown at 23, and preferably have diagonally-cut edges, whereby when the cover or shield is in its normal or operative position, as indicated in Fig. 3, the rear edges of the side flanges 17 overlap the flanges 23. The extremities of the hinge-pin are preferably bent to form hooks 29 to prevent accidental displacement; also, the supporting-wing is provided near its lower edge with upstruck spurs 21 22 to be pressed or driven into the tree below the spout 12, and near its upper edge the supporting-wing is provided with an opening 20, through which the spout extends.

In applying the device to a tree the inner end of the spout is inserted through the ring or eye 13 of the supporting-hook and through the opening 20 of the supporting-plate, and thence is driven into the bored opening formed in the tree, as in the usual practice. The bucket may be applied to or removed from the hook 14 as may be necessary, the body portion or covering-plate 16 being capable of swinging movement on its hinge-pin 28 to give access to the bucket and also to expose the condition of the contents thereof. When in its normal position, the covering-plate rests at its forward edge upon the upper edge of the bucket with the depending flange 17 exteriorly overlapping the sides of the bucket and also with the rear edges of the side flanges, as hereinbefore described, overlapping the side flanges 23 of the supporting-plate.

The accidental removal of the cover or shield and of the bucket-supporting hook is prevented by the enlarged outer end of the sap-spout.

Having described the invention, what is claimed is—

1. A cover or shield for sap-buckets having a supporting-plate, and a covering-plate movably mounted upon the supporting-plate and having its free edges downwardly flanged.

2. A cover or shield for sap-buckets having a supporting-plate provided with an aperture for the sap-spout and with spurs for engaging the tree, and a covering-plate movably mounted upon the supporting-plate and having its free edges provided with a depending flange.

3. A cover or shield for sap-buckets having a supporting-plate provided with an aperture for the sap-spout, and with upstruck spurs for engaging the tree, and a covering-plate hinged to the supporting-plate and provided at its free edges with a depending flange.

4. A cover or shield for sap-buckets having a supporting-plate provided with forwardly-projecting side flanges, and a covering-plate movably connected with the supporting-plate and having a depending flange of which the rear edges overlap those at the side edges of the supporting-plate.

5. A cover for sap-buckets having a supporting-plate and a covering-plate movably mounted upon the supporting-plate and having depending flanges, the adjacent ends of said supporting-plate and flanges overlapping.

6. A cover or shield for sap-buckets having a supporting-plate and means for securing the same to a tree, a covering-plate provided at its rear edge with a reinforcing-strip and provided at its free edges with a depending flange, and a hinge-pintle carried by the supporting-plate and engaging said covering-plate at its reinforced edge.

7. A cover for sap-buckets having a supporting-plate provided with means for attachment to a tree, a hinge-pintle carried by said supporting-plate, a downwardly-flanged covering-plate, and a reinforcing-strip embracing the rear edge of the covering-plate and engaged by said hinge-pintle.

8. A cover or shield for sap-buckets having a covering-plate reinforced at one edge and provided at the remaining edges with depending flanges, a supporting-plate to which the reinforced edge of the covering-plate is movably attached, and means for attaching the supporting-plate to a tree.

In testimony that I claim the foregoing as my own I have hereto affixed my signature in the presence of two witnesses.

FRED W. GUNN.

Witnesses:
L. W. HOHNE,
W. S. TUTTLE.